United States Patent
Bokka et al.

(10) Patent No.: US 10,246,569 B2
(45) Date of Patent: Apr. 2, 2019

(54) RECYCLING OF FIBROUS SURFACE COVERINGS

(71) Applicant: Geo-Tech Polymers, LLC, Westerville, OH (US)

(72) Inventors: Sreevalli Bokka, Chillicothe, OH (US); Chad C. Smith, Waverly, OH (US); John S. Essman, Wheelersburg, OH (US); David M. Bender, Glencoe, IL (US); Ronald L. Whaley, Portsmouth, OH (US)

(73) Assignee: GEO-TECH POLYMERS, LLC, Westerville, OH (US)

( * ) Notice: Subject to any disclaimer, the term of this patent is extended or adjusted under 35 U.S.C. 154(b) by 153 days.

(21) Appl. No.: 15/299,040

(22) Filed: Oct. 20, 2016

(65) Prior Publication Data

US 2017/0107346 A1 Apr. 20, 2017

Related U.S. Application Data

(60) Provisional application No. 62/243,998, filed on Oct. 20, 2015.

(51) Int. Cl.
| | |
|---|---|
| *C08J 11/06* | (2006.01) |
| *C11D 3/00* | (2006.01) |
| *C11D 11/00* | (2006.01) |
| *B29B 17/00* | (2006.01) |
| *C11D 1/66* | (2006.01) |
| *B29B 17/02* | (2006.01) |

(52) U.S. Cl.
CPC ............... *C08J 11/06* (2013.01); *B29B 17/00* (2013.01); *C11D 3/0031* (2013.01); *C11D 11/0017* (2013.01); *B29B 2017/0296* (2013.01); *C08J 2323/12* (2013.01); *C08J 2327/06* (2013.01); *C08J 2367/02* (2013.01); *C08J 2375/04* (2013.01); *C08J 2377/02* (2013.01); *C08J 2377/06* (2013.01); *C11D 1/66* (2013.01)

(58) Field of Classification Search
CPC .... C08J 11/06; C08J 2323/12; C08J 2327/06; C08J 2375/04; C08J 2377/02; C08J 2377/06; Y02W 30/701
See application file for complete search history.

(56) References Cited

U.S. PATENT DOCUMENTS

| | | | |
|---|---|---|---|
| 3,109,439 A | 11/1963 | Evans et al. | |
| 4,025,609 A | 5/1977 | Matsunaga | |
| 4,240,921 A | 12/1980 | Kaniecki | |
| 4,340,076 A | 7/1982 | Weitzen | |
| 5,230,473 A | 7/1993 | Hagguist et al. | |
| 5,240,530 A | 8/1993 | Fink | |
| 5,277,758 A | 1/1994 | Brooks et al. | |
| 5,323,971 A | 6/1994 | Nishibori et al. | |
| 5,331,087 A | 7/1994 | Menges | |
| 5,346,955 A | 9/1994 | Sasse et al. | |
| 5,443,772 A | 8/1995 | Inoue et al. | |
| 5,591,376 A | 1/1997 | Kiewert et al. | |
| 5,628,832 A | 5/1997 | Graham et al. | |
| 5,634,405 A | 6/1997 | Bose | |
| 5,722,603 A * | 3/1998 | Costello | B03B 5/34 241/20 |
| 5,743,568 A | 4/1998 | Smith, III | |
| 5,779,909 A | 7/1998 | Tomita | |
| 5,906,973 A | 5/1999 | Ouzounis et al. | |
| 5,957,295 A | 9/1999 | Neureither | |
| 5,985,095 A | 11/1999 | Scholz | |
| 6,138,929 A | 10/2000 | Montgomery | |
| 6,663,929 B1 | 12/2003 | Tabota | |
| 6,664,220 B2 | 12/2003 | Mayhall | |
| 6,777,067 B1 | 8/2004 | Speith-Hertuth | |
| 6,786,223 B2 | 9/2004 | Klinkhammer et al. | |
| 7,014,132 B2 | 3/2006 | Vandeputte | |
| 7,255,112 B2 | 8/2007 | Geret | |

(Continued)

FOREIGN PATENT DOCUMENTS

| | | |
|---|---|---|
| CN | 102443804 | 5/2012 |
| EP | 2832459 | 2/2015 |

(Continued)

OTHER PUBLICATIONS

Written Opinion and International Search Report issued in PCT/US15/45932, dated Nov. 23, 2015.

(Continued)

*Primary Examiner* — Frances Tischler
(74) *Attorney, Agent, or Firm* — Benesch, Friedlander, Coplan & Aronoff LLP

(57) ABSTRACT

Methods, compositions, single phase aqueous solutions, process mixtures, and kits are provided relating to recycling a fibrous surface covering, e.g., carpet, using a single-phase aqueous solution. For example, a method of recycling a fibrous surface covering may include providing the single phase aqueous solution. The single phase aqueous solution may include water and a surfactant composition. The method may include providing the fibrous surface covering. The fibrous surface covering may include: a fibrous surface layer; a first backing coupled to the fibrous surface layer; and a binder coupled to one or more of the first backing and the fibrous surface layer. The method may include contacting the single phase aqueous solution and the fibrous surface covering to form a process mixture under conditions effective to provide a recycled portion of the fibrous surface covering.

17 Claims, 2 Drawing Sheets

(56) References Cited

U.S. PATENT DOCUMENTS

| | | |
|---|---|---|
| 7,396,808 B1 | 7/2008 | Hood et al. |
| 7,465,700 B1 | 12/2008 | Ochomogo et al. |
| 7,503,332 B2 | 3/2009 | Gross et al. |
| 7,608,573 B1 | 10/2009 | Scheuing |
| 7,744,701 B1 | 6/2010 | Montie |
| 7,879,155 B1 | 2/2011 | Montie |
| 8,186,872 B2 | 5/2012 | Bartholomew et al. |
| 8,278,257 B2 | 10/2012 | Hawes et al. |
| 8,283,302 B2 | 10/2012 | Hodge et al. |
| 8,617,317 B1 | 12/2013 | Levitt |
| 8,859,483 B2 | 10/2014 | Shell |
| 9,114,551 B2 | 8/2015 | Kulesa et al. |
| 9,616,595 B2 | 4/2017 | Fullana Font et al. |
| 2001/0056047 A1 | 12/2001 | Meine et al. |
| 2002/0068684 A1 | 6/2002 | Peters |
| 2002/0077259 A1 | 6/2002 | Skee |
| 2003/0148905 A1 | 8/2003 | Motson |
| 2004/0026665 A1 | 2/2004 | Griese et al. |
| 2005/0065055 A1 | 3/2005 | Barnes |
| 2006/0089281 A1 | 4/2006 | Gibson |
| 2007/0037724 A1 | 2/2007 | Yoshikawa et al. |
| 2009/0131560 A1 | 5/2009 | Ono |
| 2009/0286892 A1 | 11/2009 | Isozaki |
| 2010/0097082 A1 | 4/2010 | Panotopoulos |
| 2010/0236582 A1 | 9/2010 | Heintz et al. |
| 2010/0305014 A1 | 12/2010 | Miralles et al. |
| 2010/0317559 A1 | 12/2010 | Ryther |
| 2011/0044919 A1 | 2/2011 | Giacomoni |
| 2011/0048458 A1 | 3/2011 | Takahashi et al. |
| 2011/0266496 A1 | 11/2011 | Mitsuda et al. |
| 2011/0318557 A1 | 12/2011 | Mitchell |
| 2012/0015857 A1 | 1/2012 | Chen et al. |
| 2012/0282433 A1 | 11/2012 | Agarwal |
| 2013/0005626 A1 | 1/2013 | Breitzke et al. |
| 2013/0072419 A1 | 3/2013 | Blattner et al. |
| 2013/0216734 A1 | 8/2013 | Van Pottelbergh et al. |
| 2013/0264734 A1 | 10/2013 | Katoh et al. |
| 2014/0027007 A1 | 1/2014 | Vargas |
| 2014/0038878 A1 | 2/2014 | O'Connell et al. |
| 2014/0069587 A1 | 3/2014 | Rackovan et al. |
| 2014/0220336 A1 | 8/2014 | Chen et al. |
| 2014/0352740 A1 | 12/2014 | Hunt |
| 2015/0021422 A1 | 1/2015 | Hall et al. |
| 2015/0119312 A1 | 4/2015 | Sanders |
| 2015/0298360 A1 | 10/2015 | Fullana Font |

FOREIGN PATENT DOCUMENTS

| | | |
|---|---|---|
| JP | 8134386 | 5/1996 |
| WO | 9313940 | 7/1993 |
| WO | 2012123814 | 9/2012 |
| WO | 2014005537 | 1/2014 |
| WO | 2016028920 | 2/2016 |

OTHER PUBLICATIONS

Written Opinion and International Search Report issued in PCT/US15/45937, dated Nov. 24, 2015.

Written Opinion and International Search Report issued in PCT/US15/45941, dated Nov. 24, 2015.

Written Opinion and International Search Report issued in PCT/US15/45943, dated Nov. 24, 2015.

Written Opinion and International Search Report issued in PCT/US16/057944, dated Mar. 3, 2017.

Written Opinion and International Search Report issued in PCT/US16/057950, dated Mar. 3, 2017.

(Donermeyer, D et al.) Laboratory and pilot-scale recycling of benign pressure sensitive adhesive stamp materials, 5th International Recycling Technology Conference, Feb. 9, 1998; pp. 1-4, 6-8, 10, 13, 24-25.

(Venditti, et al.) The effect of release liner materials on adhesive contaminants, paper recycling and recycled paper properties, 2000 Tappi Recycling Symposium, vol. 2, pp. 579-592, 2000; p. 580.

Third Party Submission filed in U.S. Appl. No. 15/049,105 dated Feb. 24, 2017.

Third Party Submission filed in U.S. Appl. No. 15/049,106 dated Feb. 24, 2017.

Third Party Submission filed in U.S. Appl. No. 15/049,107 dated Feb. 24, 2017.

* cited by examiner

200

| 200 |
|---|
| 202<br>SURFACTANT COMPOSITION |
| 204<br>INSTRUCTIONS DIRECTING A USER TO:<br><br>COMBINE SURFACTANT COMPOSITION WITH WATER TO FORM SINGLE-PHASE AQUEOUS SOLUTION; AND<br><br>CONTACT SINGLE-PHASE AQUEOUS SOLUTION AND FIBROUS SURFACE COVERING TO FORM PROCESS MIXTURE UNDER CONDITIONS EFFECTIVE TO PROVIDE RECYCLED PORTION OF FIBROUS SURFACE COVERING |

RECYCLING OF FIBROUS SURFACE COVERINGS

CROSS-REFERENCE TO RELATED APPLICATIONS

This application claims priority to U.S. Provisional Patent Application No. 62/243,998, filed on Oct. 20, 2015, which is incorporated by reference herein in its entirety.

BACKGROUND

Use and replacement of carpeting generates nearly 4 billion pounds of waste added to landfills annually. The large and increasing volumes of carpet waste is a significant industrial and environmental concern. However, major obstacles prevent achieving economical recycling of carpet. Current methods employ mechanical shearing to remove the backing from carpet fibers—a technique that may be labor intensive, time-consuming, and costly. Polymeric fibers, such as carpet fibers, may include undesirable coatings. For example, coatings may include inks, colorants, adhesives, and the like, e.g., adhesives binding such fibers to backing materials. It is desirable to process polymeric fibers to remove undesired coatings prior to further uses of the fibers, such as recycled feedstocks for remanufactured carpeting.

The present application appreciates that removing coatings and backings from carpet materials may be a challenging endeavor.

SUMMARY

In one embodiment, a process mixture is provided. The process mixture may include a fibrous surface covering in contact with a single phase aqueous solution. The fibrous surface covering may include a fibrous surface layer. The fibrous surface covering may include a first backing coupled to the fibrous surface layer. The fibrous surface covering may include a binder coupled to one or more of the first backing and the fibrous surface layer. The single-phase aqueous solution may include water. The single-phase aqueous solution may include a surfactant composition.

In another embodiment, a method is provided for recycling a fibrous surface covering using a single-phase aqueous solution. The method may include providing the single phase aqueous solution. The single phase aqueous solution may include water and a surfactant composition. The method may include providing the fibrous surface covering. The fibrous surface covering may include a fibrous surface layer. The fibrous surface covering may include a first backing coupled to the fibrous surface layer. The fibrous surface covering may include a binder coupled to one or more of the first backing and the fibrous surface layer. The method may include contacting the single phase aqueous solution and the fibrous surface covering to form a process mixture under conditions effective to provide a recycled portion of the fibrous surface covering.

In one embodiment, a kit is provided. The kit may be for recycling a fibrous surface covering. The kit may include a surfactant composition. The kit may include instructions. The instructions may direct a user to combine the surfactant composition with water to form the single-phase aqueous solution. The instructions may direct the user to contact the single phase aqueous solution and the fibrous surface covering to form a process mixture under conditions effective to provide a recycled portion of the fibrous surface covering.

In another embodiment, a recycled portion of a fibrous surface covering is provided. The recycled portion of the fibrous surface covering may include one or more of: a fibrous surface layer, a first backing, a binder, a second backing, a natural foam, a synthetic foam, a flooring adhesive residue, a pigment, a dye, an anti-stain composition, an anti-microbial composition, an anti-static composition, an anti-skid composition, and a decomposition product thereof. The recycled portion of the fibrous surface covering may be produced by a method for recycling a fibrous surface covering using a single-phase aqueous solution. The method may include providing the single phase aqueous solution. The single phase aqueous solution may include water and a surfactant composition. The method may include providing the fibrous surface covering. The fibrous surface covering may include a fibrous surface layer. The fibrous surface covering may include a first backing coupled to the fibrous surface layer. The fibrous surface covering may include a binder coupled to one or more of the first backing and the fibrous surface layer. The method may include contacting the single phase aqueous solution and the fibrous surface covering to form a process mixture under conditions effective to provide a recycled portion of the fibrous surface covering.

In another embodiment, a single-phase aqueous solution is provided. The single-phase aqueous solution may be used for recycling a fibrous surface covering. The single-phase aqueous solution may include water. The single-phase aqueous solution may include a surfactant composition.

BRIEF DESCRIPTION OF THE DRAWINGS

The accompanying figures, which are incorporated in and constitute a part of the specification, illustrate example methods and apparatuses, and are used merely to illustrate example embodiments.

DETAILED DESCRIPTION

Figure 1:
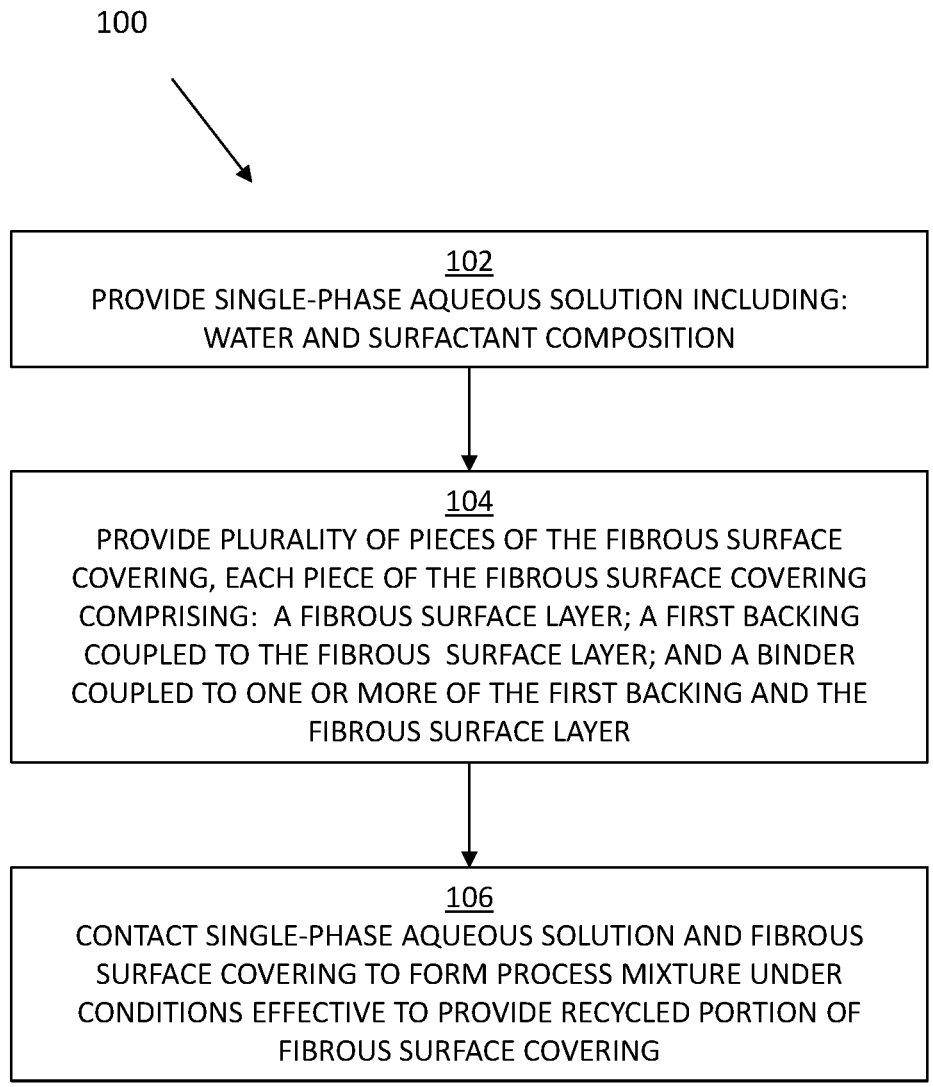
FIG. 1 is a flow diagram describing an example method.

The present application relates to compositions, process mixtures, methods, and kits for recycling a fibrous surface covering, e.g., a carpet, a rug, an upholstery, a vehicle interior, a drapery material, an article of clothing, and the like.

In various embodiments, a process mixture is provided. The process mixture may include a fibrous surface covering in contact with a single phase aqueous solution. The fibrous surface covering may include a fibrous surface layer. The fibrous surface covering may include a first backing coupled to the fibrous surface layer. The fibrous surface covering may include a binder coupled to one or more of the first backing and the fibrous surface layer. The single-phase aqueous solution may include water. The single-phase aqueous solution may include a surfactant composition.

In some embodiments, the fibrous surface covering may be a carpet, e.g., including the fibrous surface layer in the form of a face yarn, e.g., carpet pile. The fibrous surface covering may be in any other form, e.g.: a rug; an upholstery; a vehicle interior, e.g., an auto headliner; a drapery material; an article of clothing; a containment material, e.g. a luggage textile or a tent textile; and the like.

In various embodiments, the fibrous surface covering may be in the form of a plurality of pieces. The plurality of pieces of the fibrous surface covering may be derived by one or more of shredding and cutting the fibrous surface covering.

The fibrous surface covering, prior to shredding or cutting, may be in the form of one or more of: a tile, a roll, a remnant, a sample, an installation scrap, a deinstallation scrap reclaimed from an installed covering such as carpet removed from a building, a manufacturing scrap, and the like.

In some embodiments, the fibrous surface layer may include fibers of one or more of: wool; cotton; cellulose, such as wood fibers, sisal, jute, hemp, bamboo, synthetic cellulose (rayon), and the like; acrylics, e.g., polyacrylonitrile, polymethylmethacrylate (PMMA), and the like; nylon; polyester, e.g., polyethylene terephthalate (PET), polytrimethylene terephthalate (PTT, triexta), and the like; olefin, e.g., polypropylene (PP); and the like. For example, the fibrous surface layer may include fibers of one or more of: polyethylene terephthalate, polytrimethylene terephthalate, polypropylene, nylon-6, nylon-6,6, and the like. The fibrous surface layer may also include blends, e.g., composites or mixtures of such fibers, such as an olefin/nylon blend, a wool/nylon blend, and the like. The fibrous surface layer may also include copolymers comprising any of the recited fiber polymers, e.g., modacrylic copolymers comprising polyacrylonitrile. Fibers in the fibrous surface layer may be derived from previously recycled materials, such as PET from recycled beverage containers, recycled carpet pile, and the like. Fibers in the fibrous surface layer may be in the form of staple fiber or bulk continuous filament.

In several embodiments, the fibrous surface layer may be characterized by an arrangement of fibers in the form of one or more of: a woven textile, a nonwoven textile, a tufted pile, a looped pile, a patterned pile, a frieze pile, a textured pile, a multi-level pile, a cut or tip-sheared pile, a cut and loop pile, a random cut pile, a Saxony pile, a plush pile, a shag pile, a needle felt, and the like. The fibrous surface covering may include the fibrous surface layer injected into the first backing, e.g., as a needle felt, or woven into the first backing, e.g., as tufts of face yarn woven into the first backing, e.g., a warp and a weft of the first backing. The fibrous surface covering may include a second backing coupled to one or more of: the fibrous surface layer; the first backing; and the binder.

The first backing may be in the form of one or more of: woven fibers; woven slit films; films; nonwoven fibers, e.g., felts; bulk continuous fiber; and the like. The first backing may include one or more of: wool; cotton; cellulose, such as wood fibers, sisal, jute, hemp, bamboo, synthetic cellulose (rayon), and the like; acrylics, e.g., polyacrylonitrile, polymethylmethacrylate (PMMA), and the like; nylon; polyester, e.g., polyethylene terephthalate (PET), polytrimethylene terephthalate (PTT, triexta), and the like; olefin, e.g., polypropylene (PP); glass; carbon fiber; and the like. For example, the first backing may include fibers of one or more of: polypropylene, nylon, glass, and the like. The first backing may also include blends, e.g., composites or mixtures of such fibers, such as an olefin/nylon blend. The first backing may also include copolymers comprising any of the recited fiber polymers. Fibers in the first backing may be derived from previously recycled materials, such as PET from recycled beverage containers, recycled carpet pile, and the like.

In some embodiments, the binder may include one or more of a cured/curable polymeric adhesive, a thermoformed thermoplastic, and the like. For example, the binder may include one or more of: a latex; a polyurethane; an acrylic binder, e.g., an acrylic co-polymer binder; a vinyl, e.g., a polyvinyl acetate; a thermoformed polyolefin, e.g., polyethylene; copolymers thereof; blends thereof; and the like. For example, the latex may be a natural latex or a synthetic latex, for example, a synthetic latex derived from styrene-butadiene (SBS). The binder may be applied during manufacture of the fibrous surface covering as a liquid, dispersion, or emulsion, contacted to the first backing and the fibrous surface layer, e.g., latex emulsion, and cured. The binder may be applied during manufacture of the fibrous surface covering as a thermoformable powder, sheet, film, and the like, and thermally formed or melted to bind the fibrous surface covering to the first backing. The binder may be partly or fully cured as part of the fibrous surface covering.

In various embodiments, the fibrous surface covering may further include one or more of: a second backing, a natural foam padding, a synthetic foam padding, a flooring adhesive residue, a pigment, a dye, an anti-stain composition, an anti-microbial composition such as an anti-fungal composition, an anti-static composition, an anti-skid composition, and the like. The second backing may be in the form of any form described herein for the first backing and may be selected of such form independently from the first backing. The second backing may include any fiber described herein for the first backing and may be selected of such fiber independently from the first backing.

In some embodiments, the process mixture may include a recycled portion of the fibrous surface covering. The recycled portion of the fibrous surface covering may be one or more of suspended and dissolved in the process mixture. The recycled portion of the fibrous surface covering may include one or more of: the fibrous surface layer, the first backing, the binder, a second backing, a natural foam, a synthetic foam, a flooring adhesive residue, a pigment, a dye, an anti-stain composition, an anti-microbial composition, an anti-static composition, an anti-skid composition, a decomposition product thereof such as may be produced by action of the single phase aqueous solution on the fibrous surface covering, and the like. The binder may include an adhesive. The recycled portion of the fibrous surface covering may be at least partly uncoupled from the fibrous surface covering.

In several embodiments, the process mixture may include the water in a weight ratio to the fibrous surface covering of one or more of about: 4:1 to 32:1; 6:1 to 24:1; 8:1 to 20:1; 10:1 to 18:1; 10:1 to 16:1; 11:1 to 14:1; and 12.5:1.

In various embodiments, a single-phase aqueous solution is provided. The single-phase aqueous solution may be used for recycling a fibrous surface covering, as in the process mixture, the method, and the kit described herein. The single-phase aqueous solution may include water. The single-phase aqueous solution may include a surfactant composition.

In some embodiments, the single-phase aqueous solution may further include an inorganic base composition. The single-phase aqueous solution may further include one or more of a stable peroxygen composition, an acid composition, and a monosaccharide salt.

Various embodiments herein may recite the term "including," or, in the claims, the term "comprising," and their grammatical variants. For each such embodiment, corresponding additional embodiments are explicitly contemplated where the term "comprising" is replaced with "consisting essentially of" and "consisting of" For example, the single-phase aqueous solution may consist essentially of: the water and the surfactant composition. Further, for example, the single-phase aqueous solution may consist of: the water and the surfactant composition.

In some embodiments, the surfactant composition may include at least one alkoxylated alcohol, e.g., a propoxylated alcohol or an ethoxylated alcohol. For example, the surfactant composition may include at least one alkoxylated C6-C16 alcohol. The surfactant composition may include at least one ethoxylated C9-C11 alcohol. The at least one ethoxylated C9-C11 alcohol may be provided from a mixture including between about 5% and about 10% of the ethoxylated C9-C11 alcohol. Suitable mixtures including between about 5% and about 10% of the ethoxylated C9-C11 alcohol may include, for example, LPS-T91™ (LPS Laboratories, a division of Illinois Tool Works, Inc., Tucker, Ga.). The surfactant composition may include at least one alkoxylated alcohol present in a weight percentage (w/w) with respect to the water in the single-phase aqueous solution of one or more of about: 0.025% to 1%; 0.05% to about 0.75%; 0.05% to 0.5%; 0.1% to 0.25%; 0.1% to about 0.2%; and 0.15%.

In some embodiments, the surfactant composition may include at least one alkoxylated alcohol, e.g., a propoxylated alcohol, an ethoxylated alcohol, an ethoxylated/propoxylated alcohol, or a combination thereof. For example, the surfactant composition may include an alkoxylated alcohol derived from a $C_6$-$C_{16}$ alcohol, a $C_{10}$-$C_{12}$ alcohol, a $C_{11}$-$C_{14}$ alcohol, a $C_{10}$-$C_{16}$ alcohol, a $C_9$-$C_{11}$ alcohol, a combination thereof, and the like. One or more of the $C_6$-$C_{16}$ alcohol, $C_{10}$-$C_{12}$ alcohol, $C_{11}$-$C_{14}$ alcohol, $C_{10}$-$C_{16}$ alcohol, and $C_9$-$C_{11}$ alcohol may include one or more of: a primary alcohol, a secondary alcohol, a tertiary alcohol, a linear alkyl alcohol, and a branched alkyl alcohol. One or more of the alkoxylated $C_6$-$C_{16}$ alcohol, $C_{10}$-$C_{12}$ alcohol, $C_{11}$-$C_{14}$ alcohol, $C_{10}$-$C_{16}$ alcohol, and $C_9$-$C_{11}$ alcohol may include a free hydroxyl group, i.e., one or more of the $C_6$-$C_{16}$ alcohol, $C_{10}$-$C_{12}$ alcohol, $C_{11}$-$C_{14}$ alcohol, $C_{10}$-$C_{16}$ alcohol, and $C_9$-$C_{11}$ precursor included more than one hydroxyl group.

Suitable alkoxylated alcohols may include, for example, LPS-T91™ (LPS Laboratories, a division of Illinois Tool Works, Inc., Tucker, Ga.); ETHYLAN™ 1005 SA, ETHYLAN™ 1206, ETHYLAN™ TD-60, ETHYLAN™ 324, ETHYLAN™ 954, ETHYLAN™ 1008 SA, ETHYLAN™ 992, ETHYLAN™ 995, ETHYLAN™ NS 500 K, ETHYLAN™ NS 500 LQ, ETHYLAN™ SN-120, ETHYLAN™ SN-90, ETHYLAN™ TD-1407 (AzkoNobel Surface Chemistry LLC, Chicago, Ill.); IERGITOL™ 15-S-9, IERGITOL™ 15-S-3, TERGITOL™ 15-S-5, TERGITOL™ 15-S-7, TERGITOL™ 15-S-12, TERGITOL™ 15-S-15, TERGITOL™ 15-S-20, TERGITOL™ 15-S-30, TERGITOL™ 15-S-40 (Dow Chemical Company, Midland, Mich.); TOMADOL® 1200, TOMADOL® 91-8, TOMADOL® 1-9, TOMADOL® 1-3, TOMADOL® 1-5, TOMADOL® 1-7, TOMADOL® 1-73B, TOMADOL® 23-1, TOMADOL® 23-3, TOMADOL® 23-6.5, TOMADOL® 25-12, TOMADOL® 25-3, TOMADOL® 25-7, TOMADOL® 25-9, TOMADOL® 45-13, TOMADOL® 45-7, TOMADOL® 600, TOMADOL® 900, TOMADOL® 901, TOMADOL® 902, TOMADOL® 910, TOMADOL® 91-2.5, and TOMADOL® 91-6 (Air Products and Chemicals, Inc., Allentown, Pa.).

The surfactant composition may include at least one alkoxylated alcohol present in a weight percentage (w/w) with respect to the water in the single-phase aqueous solution of one or more of about: 0.025% to 1%; 0.05% to 0.75%; 0.05% to 0.5%; 0.1% to 0.25%; 0.1% to 0.2%; and 0.15%. The surfactant composition may include at least one alkoxylated alcohol present in a weight percentage (w/w) with respect to the water in the single-phase aqueous solution of greater than 1%. The surfactant composition may include at least one alkoxylated alcohol present in a weight percentage (w/w) with respect to the water in the single-phase aqueous solution of up to 5%.

In various embodiments, the surfactant composition may include one or more alkyl polyglycosides. The surfactant composition may include two or more alkyl polyglycosides. The surfactant composition may consist of, or may consist essentially of, the two or more alkyl polyglycosides. The surfactant composition may include at least one alkyl polyglycoside. The surfactant composition may consist of, or may consist essentially of, the at least one alkyl polyglycoside. The surfactant composition may include one or more alkyl polyglycosides. The surfactant composition may consist of, or may consist essentially of, the one or more alkyl polyglycosides. Each alkyl in the one or more alkyl polyglycosides may be independently selected from $C_6$-$C_{18}$ alkyl. Each alkyl in the one or more alkyl polyglycosides may be independently derived from a fatty alcohol derivative of coconut oil or palm kernel oil. Each alkyl in the one or more alkyl polyglycosides may be independently selected from $C_8$-$C_{16}$ alkyl. The surfactant composition may include two or more alkyl polyglycosides. The surfactant composition may consist of, or may consist essentially of, the two or more alkyl polyglycosides. The surfactant composition may include a $C_8$-$C_{10}$ alkyl polyglycoside and a $C_{10}$-$C_{16}$ alkyl polyglycoside. The surfactant composition may consist of, or may consist essentially of, the $C_8$-$C_{10}$ alkyl polyglycoside and the $C_{10}$-$C_{16}$ alkyl polyglycoside. The surfactant composition may include a weight ratio of a $C_8$-$C_{10}$ alkyl polyglycoside to a $C_{10}$-$C_{16}$ alkyl polyglycoside. The weight ratio may be, for example, between about 1:5 and about 2:3.

The surfactant composition may include two or more alkyl polyglucosides. The surfactant composition may consist of, or may consist essentially of, the two or more alkyl polyglucosides. The surfactant composition may include a $C_8$-$C_{10}$ alkyl polyglucoside and a $C_{10}$-$C_{16}$ alkyl polyglucoside. The surfactant composition may consist of, or may consist essentially of, the $C_8$-$C_{10}$ alkyl polyglucoside and the $C_{10}$-$C_{16}$ alkyl polyglucoside. The surfactant composition may include a weight ratio of a $C_8$-$C_{10}$ alkyl polyglucoside to a $C_{10}$-$C_{16}$ alkyl polyglucoside. The weight ratio may be, for example, between about 1:5 and about 2:3.

In various embodiments, the one or more alkyl polyglycosides in the surfactant composition may be present in the single-phase aqueous solution in a weight percentage (w/w) with respect to the water of one or more of: from about 0.01 to about 0.5, from about 0.025 to about 0.4, from about 0.05 to about 0.3, from about 0.075 to about 0.25, from about 0.1 to about 0.2, about 0.15, or a value or range of values based on any of the preceding, for example, from about 0.01% to about 0.5% or about 0.15%. Suitable alkyl polyglycoside compositions may include, for example, compositions sold under the tradename GLUCOPON®, e.g., GLUCOPON® 420UP, GLUCOPON® 425N, and the like. (BASF Corporation, Florham Park, N.J.). For example, GLUCOPON® 420UP may be employed in a weight percentage of from about 0.01% to about 0.5%, e.g., about 0.15%. Suitable alkyl polyglycoside compositions may include two or more alkyl polyglycosides, for example, GLUCOPON® 420UP may include caprylyl ($C_8$) glucoside and myristyl ($C_{14}$) glucoside.

In some embodiments, the surfactant composition may include at least one alkyl polyglycoside and at least one alkoxylated alcohol. The at least one alkyl polyglycoside and the at least one alkoxylated alcohol may include any of the alkyl polyglycosides and any of the alkoxylated alcohols described herein. The at least one alkyl polyglycoside and the at least one alkoxylated alcohol may be present in a weight percentage (w/w) with respect to the water in the single-phase aqueous solution in any of the values and value ranges described herein.

In various embodiments, the inorganic base composition may include one or more of: an alkali metal hydroxide, an alkaline earth metal oxide, or an alkaline earth metal hydroxide. Further, the inorganic base composition may consist of, or may consist essentially of, one or more of: the alkali metal hydroxide, the alkaline earth metal oxide, or the alkaline earth metal hydroxide. As used herein, alkali metals may include, for example, lithium, sodium, potassium, rubidium, or cesium. Alkaline earth metals may include, for example, beryllium, magnesium, calcium, strontium, or barium. For example, the inorganic base composition may include one or more of: lithium hydroxide, sodium hydroxide, potassium hydroxide, magnesium oxide, calcium oxide, magnesium hydroxide, or calcium hydroxide. The inorganic base composition may consist of, or may consist essentially of, one or more of: lithium hydroxide, sodium hydroxide, potassium hydroxide, magnesium oxide, calcium oxide, magnesium hydroxide, and calcium hydroxide. The inorganic base composition may include sodium hydroxide. The inorganic base composition may consist of, or may consist essentially of, sodium hydroxide.

In some embodiments, the inorganic base composition may be present in an amount effective to establish a desired hydroxide concentration in the single-phase aqueous solution. For example, the desired hydroxide concentration may have a molarity in moles/L (M) of: from about 0.0125 to about 0.625, from about 0.025 to about 0.5, from about 0.025 to about 0.375, from about 0.025 to about 0.25, from about 0.025 to about 0.125, about 0.125, about 0.0625, or a value or range of values based on any of the preceding, for example, from about 0.0125 to about 0.625, from about 0.025 to about 0.25, or about 0.125. For example, for sodium hydroxide, the inorganic base composition may be in a weight percent concentration (w/w) with respect to the water in a range of about one or more of: 0.1% to 5%, 0.1% to 4%, 0.1% to 3%, 0.1% to 2.5%, 0.1% to 2%, 0.5% to 1.5%, 0.5% to 1.25%, 0.75% to 1.25%.

In several embodiments, the stable peroxygen composition may include an alkali metal salt of one or more of: peroxide, percarbonate, persulfate, or perborate. The stable peroxygen composition may consist of, or may consist essentially of, the alkali metal salt of one or more of: peroxide, percarbonate, persulfate, or perborate. For example, the stable peroxygen composition may include sodium percarbonate. The stable peroxygen composition may consist of, or may consist essentially of, the sodium percarbonate.

In various embodiments, the stable peroxygen composition may be present in an amount effective to provide peroxide in a molar ratio to hydroxide from the inorganic base composition. The molar ratio may between about 0.5:1 to about 1.5:1, between about 0.55:1 to about 1.4:1, between about 0.6:1 to about 1.3:1, between about 0.65:1 to about 1.2:1, between about 0.7:1 to about 1.1:1, between about 0.7:1 to about 1:1, between about 0.7:1 to about 0.9:1, between about 0.7:1 to about 0.8:1, about 0.75:1, or a range between about any two of the preceding values, or about any of the preceding values. The stable peroxygen composition may be present in an amount effective to provide a peroxide concentration. The peroxide concentration may have a value in millimoles per liter (mM) of from about 9.55 mM to about 478 mM. In several embodiments, the peroxide concentration in millimoles per liter (mM) may be calculated from the hydroxide concentration based on the above molar ratios of peroxide to hydroxide.

In several embodiments, the stable peroxygen composition may include sodium percarbonate in a weight percentage (w/w) with respect to the water of one or more of about: 0.01% to 3%, 0.01% to 2.5%, 0.01% to 2%, 0.01% to 2%, 0.01% to 1.5%, 0.05% to 1%, 0.1% to 1%, 0.1% to 0.75%, 0.1% to 5%, 0.15% to 0.3%, 0.2% to 0.3%, e.g., about 0.24%, about 0.5%, about 0.1% sodium percarbonate, and the like. The stable peroxygen composition may consist of, or may consist essentially of, sodium percarbonate in a weight percentage (w/w) with respect to the water of from about 0.01% to about 0.5%.

In some embodiments, the single-phase aqueous solution may further include an acid composition. The acid composition may include an organic acid. The organic acid may include, for example, oxidized forms of glucose (i.e., gluconic acid), galactose, mannose, fructose, ribose, arabinose, and the like. The acid may be present in a weight percent concentration (w/w) with respect to the water in a range of about one or more of: 0.1% to 5%, 0.1% to 4%, 0.1% to 3%, 0.1% to 2.5%, 0.1% to 2%, 0.5% to 1.5%, 0.5% to 1.25%, 0.75% to 1.25%.

In some embodiments, the single-phase aqueous solution may further include a monosaccharide salt. The single-phase aqueous solution may include a salt of an oxidized monosaccharide. For example, the single-phase aqueous solution may include a salt of glucose, galactose, mannose, fructose, ribose, arabinose, and the like. For example, the single-phase aqueous solution may include a salt of oxidized glucose (i.e., gluconic acid), galactose, mannose, fructose, ribose, arabinose, and the like. As used herein, a salt may include a cationic species and an anionic species. For example, an anionic species may include one or more of: a carboxylate and an alkoxide. The cation may include, for example, an alkali metal, an alkaline earth metal, a transition metal, a protonated amine, and the like. For example, the cation may include $Li^+$, $Na^+$, $K^+$, $Cs^+$, $Ca^{2+}$, $Mg^{2+}$, $Fe^{2+}$, $Zn^{2+}$, quinine, and the like.

The monosaccharide salt may be present in the single-phase aqueous solution in a weight percentage (w/w) with respect to the water of one or more of: 0.01, 0.02, 0.05, 0.10, 0.20, 0.30, 0.40, 0.50, 0.60, 0.70, 0.80, 0.90, 1.0, 1.2, 1.4, 1.6, 1.8, 2.0, 2.4, 2.6, 3.0, 3.3, 3.6, 4.0, 4.2, 4.5, 4.7, and 5.0. The monosaccharide salt may be present in the single-phase aqueous solution in a weight percentage (w/w) between any of the preceding values, for example, between about 0.5 and about 1.0, or between about 0.70 and about 2.4, and the like.

The single-phase aqueous solution may include the water in a weight percent (w/w) of the single-phase aqueous solution of at least about one or more of: 90%, 91%, 92%, 93%, 94%, 95%, 96%, 97%, 98%, 99%, 99.1%, 99.2%, 99.25%, 99.3%, or 99.35%, for example, at least about 95% by weight of water. The single-phase aqueous solution may include the water in a weight percent concentration (w/w) of the single-phase aqueous solution of at least about one or more of: 99%, 99.1%, 99.2%, 99.3%, 99.4%, 99.5%, 99.6%, 99.7%, 99.8%, 99.9%, 99.925%, 99.95%, and 99.975%. Further, in some embodiments, the single-phase aqueous solution may consist, or consisting essentially of: the surfactant composition and the water in a weight percent concentration (w/w) of the single-phase aqueous solution of at least about one or more of: 99%, 99.1%, 99.2%, 99.3%, 99.4%, 99.5%, 99.6%, 99.7%, 99.8%, 99.9%, 99.925%, 99.95%, and 99.975%.

In various embodiments, the single-phase aqueous solution may be characterized by a pH value of about one or more of: 10 to 14; 10.5 to 14; 11 to 14; 11.5 to 14; 12 to 14; or 12.5 to 13.5.

In various embodiments, a method 100 is provided for recycling a fibrous surface covering using a single-phase aqueous solution. FIG. 1 depicts a flow chart of method 100. The method may include 102 providing a single phase aqueous solution. The single phase aqueous solution may include water. The single phase aqueous solution may include an surfactant composition. The method may include 104 providing the fibrous surface covering. The fibrous surface covering may include a fibrous surface layer. The fibrous surface covering may include a first backing coupled to the fibrous surface layer. The fibrous surface covering may include a binder coupled to one or more of the first backing and the fibrous surface layer. The method may include 106 contacting the single phase aqueous solution and the fibrous surface covering to form a process mixture under conditions effective to provide a recycled portion of the fibrous surface covering.

In some embodiments, the fibrous surface covering may be a carpet, e.g., including the fibrous surface layer in the form of a carpet pile. The fibrous surface covering may be in any other form, e.g., a rug, an upholstery, a drapery material, an article of clothing, and the like.

In various embodiments, the fibrous surface covering may be in the form of a plurality of pieces. The method may include forming the plurality of pieces of the fibrous surface covering by one or more of shredding and cutting the fibrous surface covering. The fibrous surface covering, prior to shredding or cutting, may be in the form of one or more of: a tile, a roll, a remnant, a sample, an installation scrap, a deinstallation scrap reclaimed from an installed covering such as carpet removed from a building, a manufacturing scrap, and the like.

In some embodiments, the fibrous surface layer may include fibers of one or more of: wool; cotton; cellulose, such as wood fibers, sisal, jute, hemp, bamboo, synthetic cellulose (rayon), and the like; acrylics, e.g., polyacrylonitrile, polymethylmethacrylate (PMMA), and the like; nylon; polyester, e.g., polyethylene terephthalate (PET), polytrimethylene terephthalate (PTT, triexta), and the like; olefin, e.g., polypropylene (PP); and the like. For example, the fibrous surface layer may include fibers of one or more of: polyethylene terephthalate, polytrimethylene terephthalate, polypropylene, nylon-6, nylon-6,6, and the like. The fibrous surface layer may also include blends, e.g., composites or mixtures of such fibers, such as an olefin/nylon blend, a wool/nylon blend, and the like. The fibrous surface layer may also include copolymers comprising any of the recited fiber polymers, e.g., modacrylic copolymers comprising polyacrylonitrile. Fibers in the fibrous surface layer may be derived from previously recycled materials, such as PET from recycled beverage containers, recycled carpet pile, and the like. Fibers in the fibrous surface layer may be in the form of staple fiber or bulk continuous filament.

The first backing may be in the form of one or more of: woven fibers; woven slit films; films; nonwoven fibers, e.g., felts; bulk continuous fiber; and the like. The first backing may include one or more of: wool; cotton; cellulose, such as wood fibers, sisal, jute, hemp, bamboo, synthetic cellulose (rayon), and the like; acrylics, e.g., polyacrylonitrile, polymethylmethacrylate (PMMA), and the like; nylon; polyester, e.g., polyethylene terephthalate (PET), polytrimethylene terephthalate (PTT, triexta), and the like; olefin, e.g., polypropylene (PP); glass; carbon fiber; and the like. For example, the first backing may include fibers of one or more of: polypropylene, nylon, glass, and the like. The first backing may also include blends, e.g., composites or mixtures of such fibers, such as an olefin/nylon blend. The first backing may also include copolymers comprising any of the recited fiber polymers. Fibers in the first backing may be derived from previously recycled materials, such as PET from recycled beverage containers, recycled carpet pile, and the like.

In some embodiments, the binder may include one or more of a cured/curable polymeric adhesive, a thermoformed thermoplastic, and the like. For example, the binder may include one or more of: a latex; a polyurethane; an acrylic binder, e.g., an acrylic co-polymer binder; a vinyl, e.g., a polyvinyl acetate; a thermoformed polyolefin, e.g., polyethylene; copolymers thereof; blends thereof; and the like. For example, the latex may be a natural latex or a synthetic latex, for example, a synthetic latex derived from styrene-butadiene (SBS). The binder may be applied during manufacture of the fibrous surface covering as a liquid, dispersion, or emulsion, contacted to the first backing and the fibrous surface layer, e.g., latex emulsion, and cured. The binder may be applied during manufacture of the fibrous surface covering as a thermoformable powder, sheet, film, and the like, and thermally formed or melted to bind the fibrous surface covering to the first backing. The binder may be partly or fully cured as part of the fibrous surface covering.

In several embodiments, the fibrous surface layer may be characterized by an arrangement of fibers in the form of one or more of: a woven textile, a nonwoven textile, a tufted pile, a looped pile, a patterned pile, a frieze pile, a textured pile, a multi-level pile, a cut or tip-sheared pile, a cut and loop pile, a random cut pile, a Saxony pile, a plush pile, a shag pile, a needle felt, and the like. The fibrous surface covering may include the fibrous surface layer injected into the first backing, e.g., as a needle felt, or woven into the first backing, e.g., as tufts of face yarn woven into the first backing, e.g., a warp and a weft of the first backing. The fibrous surface covering may include a second backing coupled to one or more of: the fibrous surface layer; the first backing; and the binder.

In various embodiments, the fibrous surface covering may include one or more of: a second backing, a natural foam padding, a synthetic foam padding, a flooring adhesive residue, a pigment, a dye, an anti-stain composition, an anti-microbial composition such as an anti-fungal composition, an anti-static composition, an anti-skid composition, and the like. The second backing may be in the form of any form described herein for the first backing and may be selected of such form independently from the first backing. The second backing may include any fiber described herein for the first backing and may be selected of such fiber independently from the first backing.

In some embodiments, the process mixture may include a recycled portion of the fibrous surface covering. The recycled portion of the fibrous surface covering may be one or more of suspended and dissolved in the process mixture. Providing the recycled portion of the fibrous surface may include one or more of suspending and dissolving the recycled portion in the process mixture. The recycled portion of the fibrous surface covering may include one or more of: the fibrous surface layer, the first backing, the binder, a second backing, a natural foam, a synthetic foam, a flooring adhesive residue, a pigment, a dye, an anti-stain composition, an anti-microbial composition, an anti-static composition, an anti-skid composition, a decomposition product thereof such as may be produced by action of the single phase aqueous solution on the fibrous surface covering, and the like. Providing the recycled portion of the fibrous surface covering may include at least partly uncoupling the recycled portion of the fibrous surface covering from the fibrous surface covering.

In several embodiments, the method may include one or more of separating and recovering the recycled portion of the fibrous surface covering from the process mixture. Such separating and recovering may be performed by any suitable method such as filtering, drying, centrifuging, float-sink separation, and the like.

In several embodiments, the process mixture may include the water in a weight ratio to the fibrous surface covering of one or more of about: 4:1 to 32:1; 6:1 to 24:1; 8:1 to 20:1; 10:1 to 18:1; 10:1 to 16:1; 11:1 to 14:1; and 12.5:1.

In various embodiments, the conditions effective to remove a portion of the one or more coatings from the fibrous surface covering may include heating the process mixture. The process mixture may be heated may be heated at a temperature of about one or more of: 50° C. to 100° C.; 60° C. to 100° C.; 60° C. to 95° C.; 60° C. to 90° C.; 60° C. to 85° C.; and 65° C. to 85° C.; 80° C. to 85° C.; 82° C., and the like.

In various embodiments, the conditions effective to remove a portion of the one or more coatings from the fibrous surface covering may include agitating the process mixture, e.g., by stirring, shaking, tumbling, and the like, e.g., by stirring using a rotor. The method may include stirring the process mixture at a rotational speed of at least about one or more of: 250 RPM to 2000 RPM, 500 RPM to 1750 RPM, 750 RPM to 1500 RPM, 1000 RPM to 1400 RPM, 1100 RPM to 1300 RPM, 1200 RPM, and the like.

In various embodiments, the method may further include recovering the recycled portion of the fibrous surface covering. The method may further include recovering at least a portion of the single phase aqueous solution after providing the recycled portion of the fibrous surface covering.

In various embodiments, the conditions effective to provide the recycled portion of the fibrous surface covering may include batch operation. The conditions effective to provide the recycled portion of the fibrous surface covering may include continuous operation.

In some embodiments, the method may include providing the water in a weight ratio to the fibrous surface covering of one or more of about: 4:1 to 32:1; 6:1 to 24:1; 8:1 to 20:1; 10:1 to 18:1; 10:1 to 16:1; 11:1 to 14:1; and 12.5:1.

The method may include providing the single-phase aqueous solution according to any of the features or values for the single-phase aqueous solution as described herein. The method may include preparing the single-phase aqueous solution according to any of the features or values for the single-phase aqueous solution as described herein. The method may include providing the process mixture according to any of the features or values for the process mixture as described herein. The method may include preparing the process mixture according to any of the features or values for process mixture as described herein.

Figure 2:
FIG. 2 is a block diagram of an example kit.

In various embodiments, a kit 200 is provided. FIG. 2 depicts a block diagram of kit 200. Kit 200 may be for recycling a fibrous surface covering. The kit may include 202 a surfactant composition. The kit may include instructions 204. The instructions may direct a user to combine the surfactant composition with water to form the single-phase aqueous solution. The instructions may direct the user to contact the single phase aqueous solution and the fibrous surface covering to form a process mixture under conditions effective to provide a recycled portion of the fibrous surface covering.

In some embodiments, the kit may include one or more of: an inorganic base composition, a stable peroxygen composition, a monosaccharide salt, and a surfactant composition. The instructions may direct a user to combine one or more of the inorganic base composition, the stable peroxygen composition, the monosaccharide salt, and the surfactant composition with water to form the single-phase aqueous solution In various embodiments, the kit may include a mixture of the surfactant composition together with water in the form of an aqueous concentrate. The instructions may direct the user to form a process mixture by contacting the single-phase aqueous solution to the fibrous surface covering. The instructions may direct the user to provide the single-phase aqueous solution according to any of the features or values for the single-phase aqueous solution as described herein. The instructions may direct the user to prepare the single-phase aqueous solution according to any of the features or values for the single-phase aqueous solution as described herein. The instructions may direct the user to provide the process mixture according to any of the features or values for the process mixture as described herein. The instructions may direct the user to prepare the process mixture according to any of the features or values for the process mixture as described herein. The instructions may direct the user to recycle the fibrous surface covering according to any of the methods described herein.

In various embodiments, a recycled portion of a fibrous surface covering is provided. The recycled portion of the fibrous surface covering may include one or more of a fibrous surface layer, a first backing, a binder, a second backing, a natural foam, a synthetic foam, a flooring adhesive residue, a pigment, a dye, an anti-stain composition, an anti-microbial composition, an anti-static composition, an anti-skid composition, and a decomposition product thereof. The recycled portion of the fibrous surface covering may be produced by any method described herein. The recycled portion of the fibrous surface covering may be produced using any process mixture described herein. The recycled portion of the fibrous surface covering may be produced using any single phase aqueous solution described herein. The recycled portion of the fibrous surface covering may be produced using any kit described herein.

The instructions may direct the user to provide the single-phase aqueous solution according to any of the features or values for the single-phase aqueous solution as described herein. The instructions may direct the user to prepare the single-phase aqueous solution according to any of the features or values for the single-phase aqueous solution as described herein. The instructions may direct the user to provide the process mixture according to any of the features or values for the single-phase aqueous solution as described herein. The instructions may direct the user to prepare the process mixture according to any of the features or values for the single-phase aqueous solution as described herein.

EXAMPLES

Example 1: Recycling of Polyethylene Terephthalate and Polypropylene Carpet Material To a reaction vessel equipped with a mechanical stirring blade was added 4.53 kg water, 1% (w/w) sodium hydroxide (w/w), 0.15% (w/w) GLUCOPON®, 0.5% (w/w) sodium percarbonate, and 0.5% gluconic acid. Whole carpet material was cut into roughly 2.54 cm cubes. About 360 g of carpet material cubes were added to the reaction vessel and the resulting reaction mixture was stirred (1200 RPM) at 74° C. for about 2.5 h. The resulting viscous slurry was observed to include the adhesive carpet backing. The PET and PP carpet fibers were removed from the slurry by filtration. Separation of the PET and PP carpet fibers was performed by a float-sink process.

Example 2: Recycling of Polyethylene Terephthalate (PET), Nylon 6 (PA6), and Nylon 6,6 (PA66); Polyurethane (PU), Polyolefin, and Polypropylene (PP) Carpet Material To a reaction vessel equipped with a mechanical stirring blade was added 4.53 kg water, 0.75% (w/w) sodium hydroxide (w/w), 0.5% (w/w) GLUCOPON®, and 0.5% sodium gluconate. Fibrous carpet tile material was ground into roughly <10 mm pieces. About 227 g of fibrous carpet tile material was added to the reaction vessel and the resulting reaction mixture was stirred (1000 RPM) at 82.2° C. for about 5-6 h. The PET, PA6, PA66, and PP carpet fibers were removed from the slurry by filtration. Separation of the PET, PA6, and PA66 carpet fibers from PU and PBT carpet backing was performed by a float-sink process, in which >99% of the polyolefin backing was separated.

Example 3: Recycling of Polyvinyl Chloride (PVC) Carpet Tile Void of Fibers with Polyurethane (PU) and Paper Coating To a reaction vessel equipped with a mechanical stirring blade was added 4.53 kg water, 0.75% (w/w) sodium hydroxide (w/w), 0.1% (w/w) GLUCOPON®, and 0.5% sodium gluconate. Non-fibrous carpet tile material was cut into roughly 2.54 cm cubes. About 227 g of non-fibrous carpet tile material was added to the reaction vessel and the resulting reaction mixture was stirred (1000 RPM) at 82.2° C. for about 3 h. The paper backing and glue was de-coated from the surface of the PVC tile regrind. The glue was separated from the paper backing and PVC tile by water washings.

Example 4: Recycling of Polyvinyl Chloride (PVC) Carpet Edging

To a reaction vessel equipped with a mechanical stirring blade was added 4.53 kg water, 0.5% (w/w) sodium hydroxide (w/w), 0.1% (w/w) GLUCOPON®, and 0.5% sodium gluconate. Non-fibrous carpet edging material was cut into roughly 1.27-2.54 cm cubes. About 227 g of non-fibrous carpet edging material was added to the reaction vessel and the resulting reaction mixture was stirred (1000 RPM) at 82.2° C. for about 3-4 h. The PVC was recovered from the slurry free of adhesive.

Prophetic Example 5: Recycling of Polyethylene Terephthalate and Polypropylene Carpet Material To a reaction vessel equipped with a mechanical stirring blade may be added 4.53 kg water, 1% (w/w) sodium hydroxide (w/w), 0.15% (w/w) GLUCOPON®, and 0.5% gluconic acid. A portion of the gluconic acid and the sodium hydroxide may be substituted with sodium gluconate. About 360 g carpet material cubes may be added to the reaction vessel and the resulting reaction mixture may be stirred (1200 RPM) at 74° C. for about 2.5 h. The resulting viscous slurry may include the adhesive carpet backing. The PET and PP carpet fibers may be removed from the slurry by filtration. Separation of the PET and PP carpet fibers may be performed by a float-sink process.

Prophetic Example 6: Recycling of Polyethylene Terephthalate and Polypropylene Carpet Material To a reaction vessel equipped with a mechanical stirring blade may be added 4.53 kg water, 1% (w/w) sodium hydroxide (w/w), 0.15% (w/w) GLUCOPON®, and 0.5% (w/w) sodium percarbonate. About 360 g carpet material cubes may be added to the reaction vessel and the resulting reaction mixture may be stirred (1200 RPM) at 74° C. for about 2.5 h. The resulting viscous slurry may include the adhesive carpet backing. The PET and PP carpet fibers may be removed from the slurry by filtration. Separation of the PET and PP carpet fibers may be performed by a float-sink process.

Prophetic Example 7: Recycling of Polyethylene Terephthalate and Polypropylene Carpet Material To a reaction vessel equipped with a mechanical stirring blade may be added 4.53 g water, 1% (w/w) sodium hydroxide (w/w), and 0.15% (w/w) GLUCOPON®. About 360 g carpet material cubes may be added to the reaction vessel and the resulting reaction mixture may be stirred (1200 RPM) at 74° C. for about 2.5 h. The resulting viscous slurry may include the adhesive carpet backing. The PET and PP carpet fibers may be removed from the slurry by filtration. Separation of the PET and PP carpet fibers may be performed by a float-sink process.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." To the extent that the term "selectively" is used in the specification or the claims, it is intended to refer to a condition of a component wherein a user of the apparatus may activate or deactivate the feature or function of the component as is necessary or desired in use of the apparatus. To the extent that the terms "operatively coupled" or "operatively connected" are used in the specification or the claims, it is intended to mean that the identified components are connected in a way to perform a designated function. To the extent that the term "substantially" is used in the specification or the claims, it is intended to mean that the identified components have the relation or qualities indicated with degree of error as would be acceptable in the subject industry.

As used in the specification and the claims, the singular forms "a," "an," and "the" include the plural unless the singular is expressly specified. For example, reference to "a compound" may include a mixture of two or more compounds, as well as a single compound.

As used herein, the term "about" in conjunction with a number is intended to include ±10% of the number. In other words, "about 10" may mean from 9 to 11.

As used herein, the terms "optional" and "optionally" mean that the subsequently described circumstance may or may not occur, so that the description includes instances where the circumstance occurs and instances where it does not.

As stated above, while the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art, having the benefit of the present application. Therefore, the application, in its broader aspects, is not limited to the specific details, illustrative examples shown, or any apparatus referred to. Departures may be made from such details, examples, and apparatuses without departing from the spirit or scope of the general inventive concept.

As used herein, "substituted" refers to an organic group as defined below (e.g., an alkyl group) in which one or more bonds to a hydrogen atom contained therein may be replaced by a bond to non-hydrogen or non-carbon atoms. Substituted groups also include groups in which one or more bonds to a carbon(s) or hydrogen(s) atom may be replaced by one or more bonds, including double or triple bonds, to a heteroatom. A substituted group may be substituted with one or more substituents, unless otherwise specified. In some embodiments, a substituted group may be substituted with 1, 2, 3, 4, 5, or 6 substituents. Examples of substituent groups include: halogens (i.e., F, Cl, Br, and I); hydroxyls; alkoxy, alkenoxy, aryloxy, aralkyloxy, heterocyclyloxy, and heterocyclylalkoxy groups; carbonyls (oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; or nitriles (i.e., CN). A "per"-substituted compound or group is a compound or group having all or substantially all substitutable positions substituted with the indicated substituent. For example, 1,6-diiodo perfluoro hexane indicates a compound of formula $C_6F_{12}I_2$, where all the substitutable hydrogens have been replaced with fluorine atoms.

Substituted ring groups such as substituted cycloalkyl, aryl, heterocyclyl and heteroaryl groups also include rings and ring systems in which a bond to a hydrogen atom may be replaced with a bond to a carbon atom. Substituted cycloalkyl, aryl, heterocyclyl and heteroaryl groups may also be substituted with substituted or unsubstituted alkyl, alkenyl, and alkynyl groups as defined below.

Alkyl groups include straight chain and branched chain alkyl groups having from 1 to 12 carbon atoms, and typically from 1 to 10 carbons or, in some examples, from 1 to 8, 1 to 6, or 1 to 4 carbon atoms. Examples of straight chain alkyl groups include groups such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, tert-butyl, neopentyl, isopentyl, and 2,2-dimethylpropyl groups. Representative substituted alkyl groups may be substituted one or more times with substituents such as those listed above and include, without limitation, haloalkyl (e.g., trifluoromethyl), hydroxyalkyl, thioalkyl, aminoalkyl, alkylaminoalkyl, dialkylaminoalkyl, alkoxyalkyl, or carboxyalkyl.

Cycloalkyl groups include mono-, bi- or tricyclic alkyl groups having from 3 to 12 carbon atoms in the ring(s), or, in some embodiments, 3 to 10, 3 to 8, or 3 to 4, 5, or 6 carbon atoms. Exemplary monocyclic cycloalkyl groups include, but are not limited to, cyclopropyl, cyclobutyl, cyclopentyl, cyclohexyl, cycloheptyl, and cyclooctyl groups. In some embodiments, the cycloalkyl group has 3 to 8 ring members, whereas in other embodiments, the number of ring carbon atoms ranges from 3 to 5, 3 to 6, or 3 to 7. Bi- and tricyclic ring systems include both bridged cycloalkyl groups and fused rings, such as, but not limited to, bicyclo[2.1.1]hexane, adamantyl, or decalinyl. Substituted cycloalkyl groups may be substituted one or more times with non-hydrogen and non-carbon groups as defined above. However, substituted cycloalkyl groups also include rings that may be substituted with straight or branched chain alkyl groups as defined above. Representative substituted cycloalkyl groups may be mono-substituted or substituted more than once, such as, but not limited to, 2,2-, 2,3-, 2,4-2,5- or 2,6-disubstituted cyclohexyl groups, which may be substituted with substituents such as those listed above.

Aryl groups may be cyclic aromatic hydrocarbons that do not contain heteroatoms. Aryl groups herein include monocyclic, bicyclic and tricyclic ring systems. Aryl groups include, but are not limited to, phenyl, azulenyl, heptalenyl, biphenyl, fluorenyl, phenanthrenyl, anthracenyl, indenyl, indanyl, pentalenyl, and naphthyl groups. In some embodiments, aryl groups contain 6-14 carbons, and in others from 6 to 12 or even 6-10 carbon atoms in the ring portions of the groups. In some embodiments, the aryl groups may be phenyl or naphthyl. Although the phrase "aryl groups" may include groups containing fused rings, such as fused aromatic-aliphatic ring systems (e.g., indanyl or tetrahydronaphthyl), "aryl groups" does not include aryl groups that have other groups, such as alkyl or halo groups, bonded to one of the ring members. Rather, groups such as tolyl may be referred to as substituted aryl groups. Representative substituted aryl groups may be mono-substituted or substituted more than once. For example, monosubstituted aryl groups include, but are not limited to, 2-, 3-, 4-, 5-, or 6-substituted phenyl or naphthyl, which may be substituted with substituents such as those above.

Aralkyl groups may be alkyl groups as defined above in which a hydrogen or carbon bond of an alkyl group may be replaced with a bond to an aryl group as defined above. In some embodiments, aralkyl groups contain 7 to 16 carbon atoms, 7 to 14 carbon atoms, or 7 to 10 carbon atoms. Substituted aralkyl groups may be substituted at the alkyl, the aryl or both the alkyl and aryl portions of the group. Representative aralkyl groups include but are not limited to benzyl and phenethyl groups and fused (cycloalkylaryl)alkyl groups such as 4-indanylethyl. Substituted aralkyls may be substituted one or more times with substituents as listed above.

Groups described herein having two or more points of attachment (i.e., divalent, trivalent, or polyvalent) within the compound of the technology may be designated by use of the suffix, "ene." For example, divalent alkyl groups may be alkylene groups, divalent aryl groups may be arylene groups, divalent heteroaryl groups may be heteroarylene groups, and so forth. In particular, certain polymers may be described by use of the suffix "ene" in conjunction with a term describing the polymer repeat unit.

Alkoxy groups may be hydroxyl groups (—OH) in which the bond to the hydrogen atom may be replaced by a bond to a carbon atom of a substituted or unsubstituted alkyl group as defined above. Examples of linear alkoxy groups include, but are not limited to, methoxy, ethoxy, propoxy, butoxy, pentoxy, or hexoxy. Examples of branched alkoxy groups include, but are not limited to, isopropoxy, sec-butoxy, tert-butoxy, isopentoxy, or isohexoxy. Examples of cycloalkoxy groups include, but are not limited to, cyclopropyloxy, cyclobutyloxy, cyclopentyloxy, or cyclohexyloxy. Representative substituted alkoxy groups may be substituted one or more times with substituents such as those listed above.

The various aspects and embodiments disclosed herein are for purposes of illustration and are not intended to be limiting, with the true scope and spirit being indicated by the following claims.

The invention claimed is:

1. A process mixture, comprising:
a fibrous surface covering in contact with a single phase aqueous solution;
the fibrous surface covering comprising:
  a fibrous surface layer;
  a first backing coupled to the fibrous surface layer;
  a binder coupled to one or more of the first backing and the fibrous surface layer; and
the single-phase aqueous solution comprising:
  water;
  a surfactant composition, the surfactant composition consisting essentially of one or more alkyl polyglycosides in a weight percentage (w/w) with respect to the water of about 0.01% to 0.5%;
  an inorganic base composition;
  a stable peroxygen composition; and
  a monosaccharide salt,
the process mixture characterized by a pH value of about 10 to about 14.

2. The process mixture of claim 1, the fibrous surface covering being one or more of: a carpet comprising the fibrous surface layer in the form of a carpet pile; and in the form of a plurality of pieces, the plurality of pieces of the fibrous surface covering being derived by one or more of shredding and cutting the fibrous surface covering in the form of one or more of: a tile, a roll, a remnant, a sample, an installation scrap, a deinstallation scrap, and a manufacturing scrap.

3. The process mixture of claim 1, comprising one or more of:
the fibrous surface covering comprising the fibrous surface layer as one or more of: injected into the first backing and woven into the first backing;
one or more of the fibrous surface layer and the first backing independently comprising fibers of one or more of: wool; cotton; acrylic; cellulose; sisal; jute; hemp; bamboo; an acrylic, a nylon; polyethylene terephthalate, polytrimethylene terephthalate; an olefin; blends thereof; copolymers thereof; and recycled fibers thereof;
the fibrous surface layer comprising fibers in the form of one or more of: staple fiber and bulk continuous filament;
the fibrous surface layer being characterized by an arrangement of fibers in the form of one or more of: a woven textile, a nonwoven textile, a tufted pile, a looped pile, a patterned pile, a frieze pile, a textured pile, a multi-level pile, a cut or tip-sheared pile, a cut and loop pile, a random cut pile, a Saxony pile, a plush pile, a shag pile, and a needle felt;
the first backing comprising the form of one or more of: woven fibers; woven slit films; nonwoven fibers; and bulk continuous fiber;
the fibrous surface covering comprising a second backing coupled to one or more of: the fibrous surface layer; the first backing and the binder; and
the binder comprising one or more of: a latex; a polyurethane; an acrylic; a vinyl, a thermoformed thermoplastic; a copolymer thereof; and a blend thereof.

4. The process mixture of claim 1, comprising:
the water in a weight ratio to the fibrous surface covering of one or more of about: 4:1 to 32:1; 6:1 to 24:1; 8:1 to 20:1; 10:1 to 18:1; 10:1 to 16:1; 11:1 to 14:1; and 12.5:1; and
the water in a weight percent concentration (w/w) of the single-phase aqueous solution of at least about one or more of: 95%, 96%, 97%, 98%, 99%, 99.1%, 99.2%, 99.25%, 99.3%, and 99.35%.

5. The process mixture of claim 1, the single-phase aqueous solution further comprising,
the inorganic base composition comprising one or more of: an alkali metal hydroxide, an alkaline earth metal oxide, or an alkaline earth metal hydroxide, and
the inorganic base composition being present in an amount effective to establish a hydroxide concentration in moles/liter (M) of about one or more of: 0.0125 M to 0.625 M; 0.025 M to 0.5 M; 0.025 M to 0.375 M; 0.025 M to 0.25 M; 0.025 M to 0.125 M; and 0.0625 M.

6. The process mixture of claim 1, the single-phase aqueous solution further comprising,
the stable peroxygen composition comprising an alkali metal salt of one or more of: peroxide, percarbonate, persulfate, and perborate; and
the stable peroxygen composition being present in an amount effective to provide a peroxide concentration having a molarity of from about 9.55 mM to about 478 mM.

7. The process mixture of claim 1, the single-phase aqueous solution further comprising
monosaccharide salt in a weight percentage (w/w) with respect to the water of about: 0.01% to 5%.

8. The process mixture of claim 1, characterized by one or more of:
the surfactant composition being present in a weight percentage (w/w) with respect to the water of one or more of about: 0.025% to about 0.4%; 0.05% to 0.3%; 0.075% to 0.25%; 0.1% to about 0.2%; and 0.15%; and
pH value of about one or more of: 10.5 to 14; 11 to 14; 11.5 to 14; 12 to 14; and 12.5 to 13.5.

9. A method for recycling a fibrous surface covering by forming the process mixture of claim 1, comprising:
providing the single phase aqueous solution;
providing the fibrous surface covering comprising:
  a fibrous surface layer;
  a first backing coupled to the fibrous surface layer;
  a binder coupled to one or more of the first backing and the fibrous surface layer; and
contacting the single phase aqueous solution and the fibrous surface covering to form a process mixture under conditions effective to provide a recycled portion of the fibrous surface covering.

10. The method of claim 9, further comprising one or more of:
at least partly uncoupling the recycled portion of the fibrous surface covering from the fibrous surface covering;

suspending the recycled portion in the process mixture;
dissolving the recycled portion in the process mixture;
separating the recycled portion of the fibrous surface covering from the process mixture; and
recovering the recycled portion of the fibrous surface covering from the process mixture.

11. The method of claim 9, the conditions effective to provide the recycled portion of the fibrous surface covering comprising one or more of:
heating the process mixture at a temperature of about one or more of: 50° C. to 100° C.; 60° C. to 100° C.; 60° C. to 95° C.; 60° C. to 90° C.; 60° C. to 85° C.; and 65° C. to 85° C.; 80° C. to 85° C.; and 82° C.; and
agitating the process mixture.

12. The method of claim 9, further comprising recovering at least a portion of the single phase aqueous solution after providing the recycled portion of the fibrous surface covering.

13. The method of claim 9, comprising one or more of:
providing the water in a weight ratio to the fibrous surface covering of one or more of about: 44:1 to 32:1; 6:1 to 24:1; 8:1 to 20:1; 10:1 to 18:1; 10:1 to 16:1; 11:1 to 14:1; and 12.5:1; and
providing the surfactant composition in a weight percentage (w/w) with respect to the water of one or more of about: 0.05% to about 0.75%; 0.05% to 0.5%; 0.1% to 25%; 0.1% to about 0.2%; and 0.15%.

14. The method of claim 9, the single phase aqueous solution comprising:
the inorganic base composition comprising one or more of: an alkali metal hydroxide, an alkaline earth metal oxide, or an alkaline earth metal hydroxide; the inorganic base composition being present in a weight percent concentration (w/w) with respect to the water in a range of about one or more of: 0.1% to 5%, 0.1% to 4%, 0.1% to 3%, 0.1% to 2.5%, 0.2% to 2%, 0.5% to 1.6%, 0.5% to 1.2%, 0.6% to 1%, and 0.75%; and
the stable peroxygen composition comprising an alkali metal salt of one or more of: peroxide, percarbonate, persulfate, and perborate; the stable peroxygen composition being present in a weight percentage (w/w) with respect to the water of one or more of about: 0.01% to 3%, 0.01% to 2.5%, 0.01% to 2%, 0.01% to 2%, 0.01% to 1.5%, 0.05% to 1.5%, 0.25% to 1.5%, 0.25% to 1.25%, 0.5% to 1.25%, 0.75% to 1.25%, and 0.75% and
the monosaccharide salt being present in a weight percentage (w/w) with respect to the water of about 0.01% to 5%.

15. The method of claim 9, comprising stirring the process mixture at a rotational speed of at least about one or more of: 250 RPM to 2000 RPM, 500 RPM to 1750 RPM, 750 RPM to 1500 RPM, 1000 RPM to 1400 RPM, 1100 RPM to 1300 RPM, and 1200 RPM.

16. The method of claim 9, the fibrous surface covering being one or more of: a carpet comprising the fibrous surface layer in the form of a carpet pile; in the form of a plurality of pieces.

17. The method of claim 9, the fibrous surface covering comprising one or more of:
the first backing, comprising one or more of: wool, cotton, acrylic, cellulose, sisal, jute, hemp, bamboo, an acrylic, a nylon, polyethylene terephthalate, polytrimethylene terephthalate, a polyolefin, glass, carbon fiber; blends thereof, copolymers thereof, and recycled fibers thereof, and the first backing being in the form of one or more of: woven fibers; woven slit films; films; nonwoven fibers; and bulk continuous fiber;
the binder comprising one or more of: a latex; a polyurethane; an acrylic; a vinyl, a thermoformed thermoplastic; a copolymer thereof; and a blend thereof; and
the fibrous surface layer comprising one or more of:
fibers in the form of one or more of: staple fiber and bulk continuous filament;
fibers of one or more of: wool; cotton; acrylic; cellulose; sisal; jute; hemp; bamboo; an acrylic, a nylon; polyethylene terephthalate, polytrimethylene terephthalate; an olefin; blends thereof; copolymers thereof; and recycled fibers thereof;
one or more of: injected into the first backing and woven into the first backing;
a second backing coupled to one or more of: the fibrous surface layer; the first backing; and the binder; and
one or more of: a second backing, a natural foam padding, a synthetic foam padding, a flooring adhesive residue, a pigment, a dye, an anti-stain composition, an anti-static composition, an anti-skid composition, and an anti-microbial composition.

* * * * *